(12) United States Patent
Fischer (10) Patent No.: US 8,660,575 B2
(45) Date of Patent: Feb. 25, 2014

(54) METHOD FOR TRACKING AREA MANAGEMENT OF A MOBILE TERMINAL USING A DISCONTINUOUS RECEPTION (DRX) MODE

(75) Inventor: Patrick Fischer, Paris (FR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 12/517,060

(22) PCT Filed: Dec. 28, 2007

(86) PCT No.: PCT/KR2007/006953
§ 371 (c)(1),
(2), (4) Date: May 29, 2009

(87) PCT Pub. No.: WO2008/082193
PCT Pub. Date: Jul. 10, 2008

(65) Prior Publication Data
US 2010/0069088 A1 Mar. 18, 2010

Related U.S. Application Data

(60) Provisional application No. 60/883,503, filed on Jan. 4, 2007.

(51) Int. Cl.
*H04W 24/00* (2009.01)
(52) U.S. Cl.
USPC ................................. 455/456.1; 455/435.2
(58) Field of Classification Search
USPC ........ 455/456.1, 450, 435.1, 432.1, 410, 411, 455/456.3, 404.1, 403, 406, 408, 422.1, 455/436, 442, 445, 552.1, 560; 370/332, 370/311, 216, 254, 310, 316, 318, 320, 328, 370/329, 331, 335, 338, 349, 352, 390, 370/395.52
See application file for complete search history.

(56) References Cited

U.S. PATENT DOCUMENTS

| | | | |
|---|---|---|---|
| 6,377,791 B1 * | 4/2002 | Pirila | 455/410 |
| 6,950,662 B2 * | 9/2005 | Kumar | 455/456.3 |
| 7,480,508 B2 * | 1/2009 | Balachandran et al. | 455/435.1 |
| 2004/0066777 A1 * | 4/2004 | Vesterinen et al. | 370/352 |
| 2004/0266453 A1 * | 12/2004 | Maanoja et al. | 455/456.1 |
| 2005/0054349 A1 | 3/2005 | Balachandran et al. | |
| 2007/0232320 A1 * | 10/2007 | Casati et al. | 455/456.1 |
| 2007/0275707 A1 | 11/2007 | Kwak et al. | |

OTHER PUBLICATIONS

Tung, et al., "A Kalman-Filter Based Paging Strategy for Cellular Networks", IEEE, Jan. 2003, 10 pages.
Taiwan Intellectual Property Office Application Serial No. 097100094, Office Action dated Dec. 22, 2012, 6 pages.
Tung, T., et al., "A Kalman-Filter Based Paging Strategy for Cellular Networks," Proceedings of the 36th Hawaii International Conference on System Sciences, Jan. 6-9, 2003 (10 pages).

(Continued)

*Primary Examiner* — Edward Urban
*Assistant Examiner* — Golam Sorowar
(74) *Attorney, Agent, or Firm* — Lee, Hong, Degerman, Kang & Waimey (57) ABSTRACT

Methods and a mobile terminal for tracking area management of a mobile terminal using a discontinuous reception (DRX) mode are provided. By having the mobile terminal indicate information to the network related to the cells and/or tracking areas on which the mobile terminal has camped, selection of the most suitable tracking areas for the mobile terminal is facilitated.

14 Claims, 7 Drawing Sheets

(56) References Cited

OTHER PUBLICATIONS

Mitsubishi Electric, "Velocity-optimised tracking areas," 3GPP TSG RAN WG3 Meeting #51bis, R3-060492, XP50159416, Apr. 2006, 4 pages.

NEC, "UE-reporting based network-assigned Tracking Areas," 3GPP TSG RAN WG3 Meeting #53, R3-061087, XP008122160, Aug. 2006, 6 pages.

Ericsson, "Idle Mobility and Tracking Area Concept in SAE/LTE," TSG-RAN WG3 Meeting #50, R3-060049, XP002466404, Jan. 2006, 6 pages.

Ericsson, "Evaluation of tracking area concept alternatives," 3GPP TSG RAN WG3 Meeting #54, R3-061786, XP050160670, Nov. 2006, 6 pages.

European Patent Office Application Serial No. 07860737.1, Search Report dated Aug. 22, 2013, 7 pages.

* cited by examiner

METHOD FOR TRACKING AREA MANAGEMENT OF A MOBILE TERMINAL USING A DISCONTINUOUS RECEPTION (DRX) MODE

This application is the National Stage filing under 35 U.S.C. 371 of International Application No. PCT/KR2007/006953, filed on Dec. 28, 2007, which claims the benefit of U.S. Provisional Application Ser. No. 60/883,503 filed on Jan. 4, 2007, the contents of all of which are hereby incorporated by reference herein in their entirety.

DISCLOSURE OF INVENTION

Technical Solution

The present invention is directed to a discontinuous reception (DRX) mode of a mobile terminal and, specifically, to tracking area management methods for a mobile terminal.

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

Figure 1:
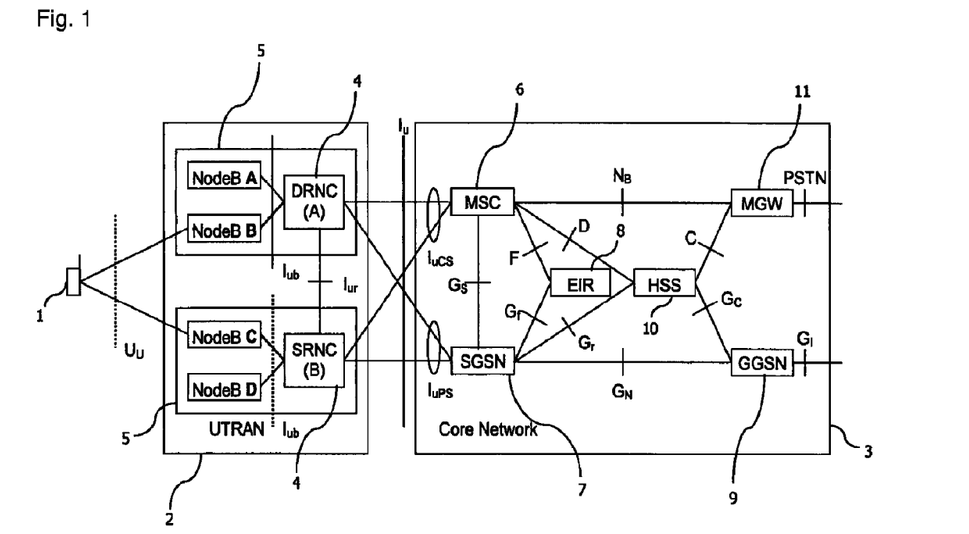
FIG. 1 illustrates an overview of a UMTS network.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the Iub interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the GS interface, to the gateway GPRS support node (GGSN) 9 via the GN interface, and to the home subscriber server (HSS) via the GR interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the $G_C$ interface and to the Internet via the $G_I$ interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

Figure 2:
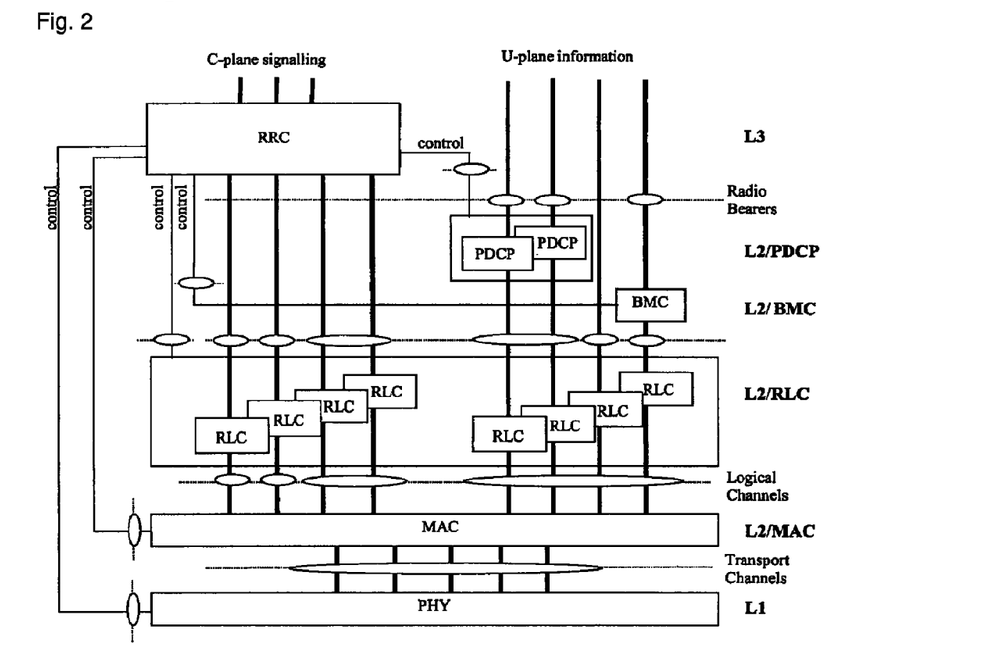
FIG. 2 illustrates a structure of a radio interface protocol between a UE and the UTRAN according to the 3GPP radio access network standards.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

One of the most crucial functions in a mobile communication system is efficient power saving states for the UE 1 and efficient use of radio resources. This is addressed in many cases by a discontinuous reception (DRX) mode when the UE 1 is inactive. Allowing the UE 1 to switch on its receiver only occasionally can reduce battery consumption.

The UTRAN 2 sends a short message, such as a paging message, to the UE 1 in order to wake up the UE and trigger establishment of a connection between the UE and the UTRAN when the UTRAN needs to access the UE. The mobility of the UE 1 must be effectively controlled in order for the network to send a paging message on the cell on which the UE is listening. Therefore, mobility procedures have been created.

Each UE 1 performing DRX is assigned an area within which it is allowed to move without updating the network when it changes the cell it is listening to. Each of these area codes is referred to as a Location Area (LA) assigned by the MSC 6 or a Routing Area (RA) that is assigned to the UE 1 by the SGSN 7 or a UMTS Routing Area (URA) that is assigned to the UE by the RNC 4 assigns each LA to the UE.

Each cell in a UMTS system indicates to the UE 1 via system information the LA, RA or URA to which the cell belongs. A UE 1 using a DRX mode can change to any cell indicated as belonging to the LA, RA or URA to which the UE has been assigned. On the other hand, the UE 1 contacts the UTRAN 2 in order to indicate that it has changed location when the UE changes to a cell that is not indicated as belonging to the LA, RA or URA to which the UE has been assigned.

Therefore, the UTRAN 2 needs only to send the paging message via the cells that belong to the LA, RA or URA to which the UE 1 has been assigned in order to contact the UE and radio resources are used only on the set of cells on which the UE is registered. Furthermore, the UE 1 does not need to update its location at each change of cell.

The number of cells that belong to a LA, RA or URA is a trade-off between the frequency of the update that the UE 1 must perform and the number of cells on which the paging message must be sent. For example, the UE 1 will not need to contact the URTRAN 2 frequently but the paging message must be sent from many cells on which the UE might camp if an LA, RA or URA contains many cells. On the other hand, the UE will need to frequently contact the UTRAN 2 to indicate that it has left its assigned LA, RA or URA but the paging message only needs to be sent to few cells if an LA, RA, URA contains only a few cells.

Another reason for the UE 1 to perform a location area update is a periodic location area update. The UE 1 and the UTRAN 2 start a timer having a value known to both the UTRAN and the UE when the UE 1 has performed a location area update. The UE performs another location area update upon expiration of the timer.

The UTRAN 2 can detect that the UE 1 is no longer available when the UTRAN detects that the UE has not performed a location area update after the timer has expired. The UE 1 may no longer be available because the UE is out of the coverage area or when the UE is switched off, for example, due to battery problems. The UTRAN 2 can choose a slightly higher timer value before the UE 1 is determined as unavailable in order to allow for some delay in the location area update.

One cell can belong to only one LA and to only one RA in the UMTS system. One cell in a UMTS system can belong to several URAs. Therefore, one cell may belong to one LA, one RA, and one or more URAs.

Figure 3:
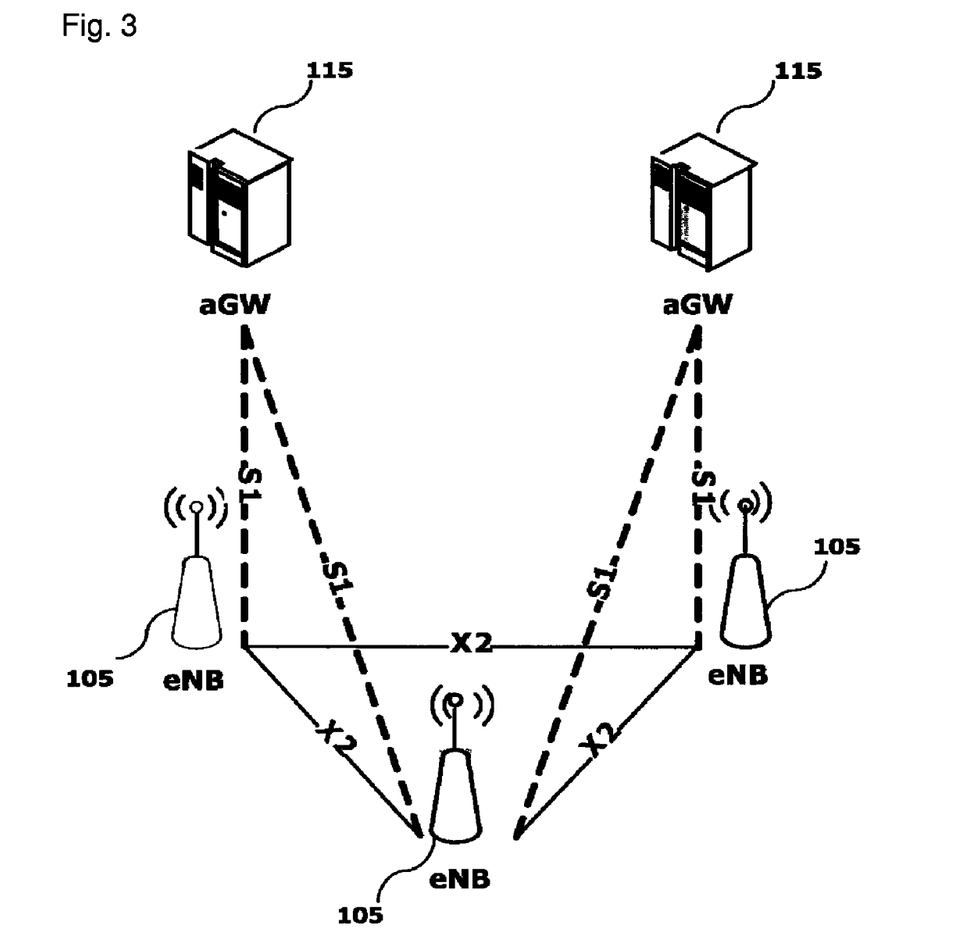
FIG. 3 illustrates the architecture of an LTE system.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity FIG. 3 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3G LTE requires reduced cost per bit, increased service availability, flexible use of frequency bands, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) in the LTE system.

Figure 4:
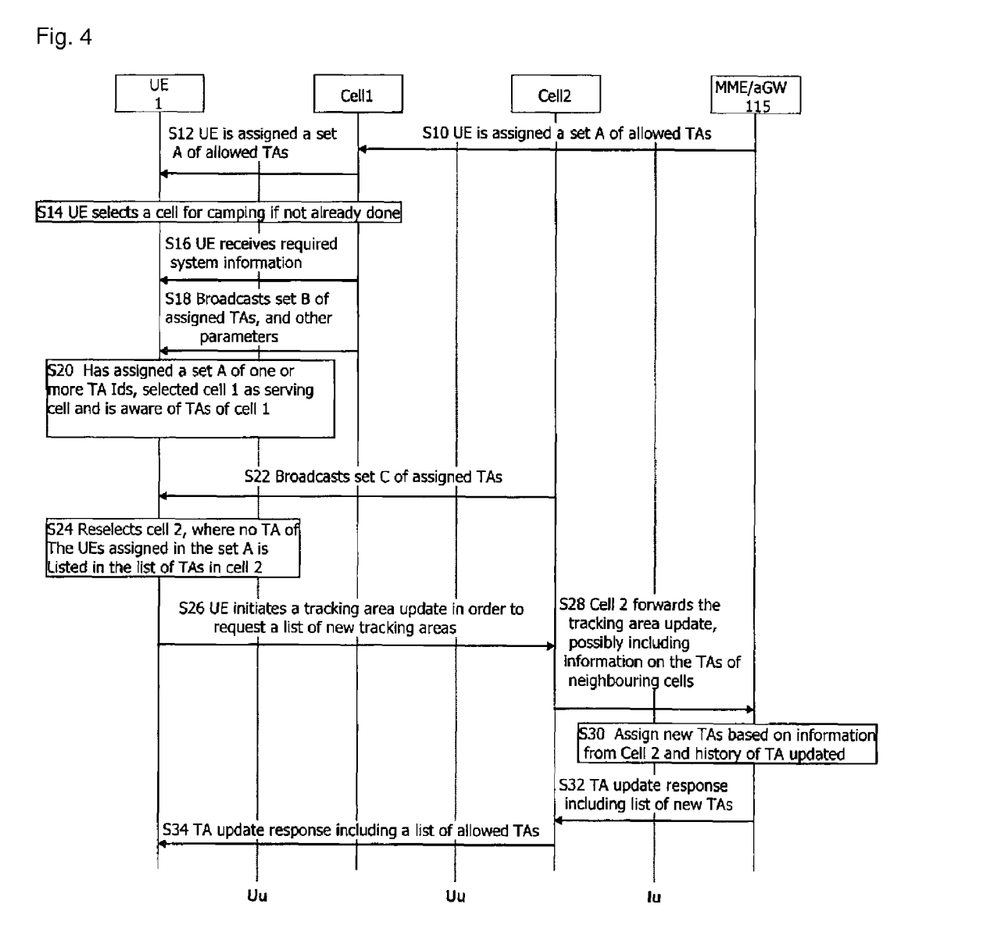
FIG. 4 illustrates the principle of a TA update.
Figure 5:
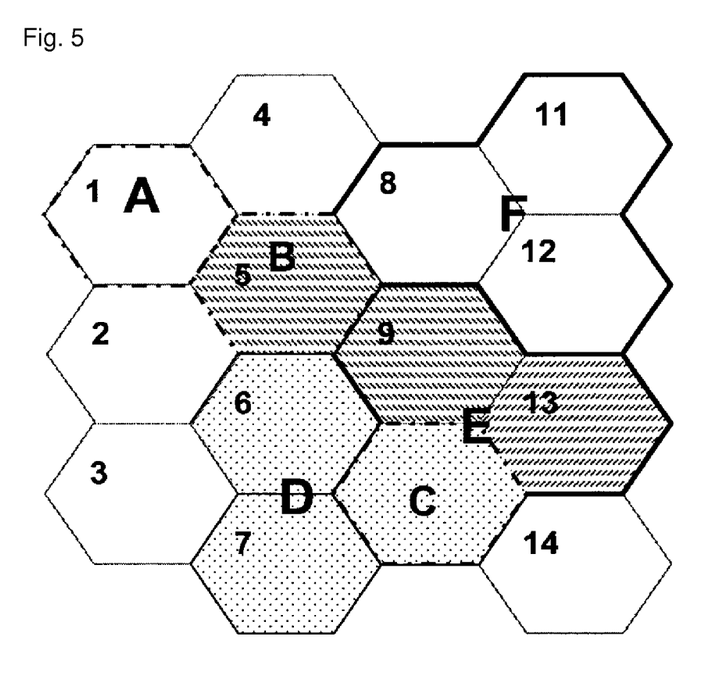
FIG. 5 illustrates an example of cells and TAs.

The principle of a TA update is illustrated in FIG. 4. FIG. 5 illustrates an example of cells and TAs. The example in FIG. 5 illustrates 14 cells including hierarchal and overlaying tracking areas.

The mobility of the UE 1 in DRX mode is controlled by the aGW 115 in LTE. The aGW 115 assigns a TA (Tracking Area) identity to the UE 1 and each cell broadcasts TA identities. Each aGW 115 can manage several cells, which are distinguished by the fact that they transmit in a given frequency and in a geographical area. Different combinable strategies are investigated in LTE.

Generally, each cell can belong to one or several TAs and the TAs can be organized hierarchically or overlapping. There is no restriction as to which cell belongs to a TA with overlapping TAs. However, one TA, such as $TA_B$ on a lower hierarchical level, includes only cells that are contained in a TA, such as $TA_A$ on a higher hierarchical level, which results in the relations between TAs being managed differently. The principles for mobility management when a UE 1 is assigned a TA or when the UE 1 leaves a TA in LTE is the same as in UMTS.

Another principle investigated is to assign to one UE 1 multiple TAs. The UE 1 does not have to perform a TA update as long as the UE is under the coverage of a TA to which it has been assigned. This saves resources for the broadcast of the TAs from the aGW 115, but increases the resources that are needed to assign multiple TAs to the UE 1. One inconvenience is that the entity that assigns the TAs must have some knowledge regarding the geographical coverage and neighborhood relations of the TAs.

As illustrated in FIG. 5, $TA_A$ includes one cell with the number 1, $TA_B$ includes cell 5 and $TA_D$ includes cells 6, 7 and 10, and is overlapping with $TA_E$ that includes cells 9, and 13. Therefore, cell 10 is assigned multiple tracking areas, specifically $TA_D$ and $TA_E$. Further as illustrated in FIG. 5, $TA_C$ includes cell 10 and $TA_E$ and $TA_C$ can be seen as an example of hierarchical tracking areas. Moreover, as illustrated in FIG. 5, $TA_F$ includes cells 8, 11 and 12.

If a UE 1 is assigned $TA_E$, $TA_B$ and $TA_C$ in the example illustrated in FIG. 5, the UE does not need to perform a TA update as long as the UE is under the coverage of one of cells 5, 9, 10 and 13. However, the UE 1 must contact the aGW 115 in order to be assigned a suitable TA as soon as the UE is under the coverage of any other cell.

The aGW 115 and the UE 1 must negotiate the most suitable area if a cell of a mobile communication system belongs to different areas used for mobility management. The aGW 115 requires extensive information related to the mobility and activity of the UE 1 as well as the network topology and the geographical split of the network in order to decide the most suitable tracking area.

A UE 1 facilitates efficient resource handling in a mobile communication system generally by moving between an active state and an inactive state. UE 1 mobility is controlled by the aGW 115 and the UE position is exactly known by the aGW in the active state. The UE 1 controls mobility and performs DRX and the location of the UE is known only on a cell group basis according to a cell group identifier (CGI) such as LA, RA, URA or TA in the inactive state. Although the subsequent description is with respect to only TA, it is to be understood that any of LA, RA, URA, TA, or any other type of identifier or even a cell identifier may be used to identify a set of at least one cell.

It is important to choose the most suitable TAs in order to allow an efficient use of radio and network resources and to reduce the UE 1 battery consumption when a cell can belong to different TAs or where a UE can be assigned a set of TAs. In principle the aGW 115 can keep track of the TAs to which the UE 1 was connected when the UE initiates an update of the assigned TA list. Therefore, the aGW 115 can analyze the mobility pattern of the UE 1 and assign the most suitable TAs to the UE.

There are several disadvantages with conventional methods. It is not possible for the aGW 115 to know in which cell a UE 1 is located if the UE is assigned to one or more TAs or a TA includes more than one cell. Furthermore, the aGW 115 has no knowledge of the cells into which the UE 1 is moving if the UE moves inside a group of cells that are assigned to the UE as allowed cells within which the UE may move without triggering a TA update procedure. Moreover, the aGW 115 may not want to or be able to keep track of the former TAs allocated to the UE1. Moreover, the aGW may not have knowledge regarding the geographical areas covered by the TAs and the relationship between the coverage of different TAs.

In one aspect of the present invention, a method of updating a location of a mobile terminal is provided. The method includes receiving a first assignment of at least one tracking area within which the mobile terminal is allowed to move without performing a tracking area update, the at least one tracking area including a first group of one or more communication cells and performing a tracking area update process upon the occurrence of a trigger condition by transmitting information corresponding to at least one of movement of the mobile terminal, one or more communication cells and one or more tracking areas.

It is contemplated that the method further includes receiving a second assignment of at least one tracking area within which the mobile terminal is allowed to move without performing a tracking area update. It is further contemplated that the second assignment of at least one tracking area is based on the transmitted information.

It is contemplated that the transmitted information includes at least one of the identity of each of a specified number of most recent communication cells selected by the mobile terminal, the identity of each tracking area that includes each of a specified number of most recent communication cells selected by the mobile terminal, the identity of each communication cell selected by the mobile terminal during a specified immediately previous time interval, the times at which the mobile terminal selected each communication cell that was selected during a specified immediately previous time interval, the identity of each tracking area that includes a communication cell selected by the mobile terminal during a specified immediately previous time interval, the times during a specified immediately previous time interval at which the mobile terminal selected a communication cell not included in any tracking area in which the immediately previous selected communication cell was included, the speed at which the mobile communication terminal is moving, the direction in which the mobile communication terminal is moving, the frequency of transitions between communication cells, the frequency of transitions between tracking areas, for each tracking area assigned to the mobile terminal, the last time at which the mobile terminal selected a communication cell included in the corresponding assigned tracking area, for each tracking area assigned to the mobile terminal, the last time at which the mobile terminal selected a communication cell not included in the corresponding assigned tracking area, for each tracking area that includes the currently selected communication cell, the last time at which the mobile terminal selected a communication cell not included in the corresponding tracking area that includes the currently selected communication cell and for each communication cell that is a neighbor to the currently selected communication cell, the tracking areas that include the corresponding neighbor communication cell. It is further contemplated that the method further includes receiving an indication of a type of the information to transmit.

It is contemplated that the indication of the type of the information to transmit is received with the first assignment of at least one tracking area. It is further contemplated that the indication of the type of the information to transmit is received with a second assignment of at least one tracking area.

It is contemplated that the trigger condition includes the mobile communication terminal moving to a communication cell not included in the first assigned at least one tracking area. It is further contemplated that the trigger condition is the elapse of a specified time since performing a most recent tracking area update process. Preferably, the trigger condition is the mobile communication terminal remaining within a communication cell for greater than a specific amount of time.

In another aspect of the present invention, a method of updating a location of a mobile terminal is provided. The method includes transmitting a first assignment of at least one tracking area within which the mobile terminal is allowed to move without performing a tracking area update, the at least one tracking area including a first group of at least one communication cell and receiving information corresponding to at least one of movement of the mobile terminal, one or more communication cells and one or more tracking areas.

It is contemplated that the method further includes transmitting a second assignment of at least one tracking area within which the mobile terminal is allowed to move without performing a tracking area update. It is further contemplated that the second assignment of at least one tracking area is based on the received information.

It is contemplated that the method further includes receiving the first assignment of at least one tracking area from a core network. It is further contemplated that the method further includes receiving the second assignment of at least one tracking area from a core network.

It is contemplated that the received information includes at least one of the identity of each of a specified number of most recent communication cells selected by the mobile terminal, the identity of each tracking area that includes each of a specified number of most recent communication cells selected by the mobile terminal, the identity of each communication cell selected by the mobile terminal during a specified immediately previous time interval, the times at which the mobile terminal selected each communication cell that was selected during a specified immediately previous time interval, the identity of each tracking area that includes a communication cell selected by the mobile terminal during a specified immediately previous time interval, the times during a specified immediately previous time interval at which the mobile terminal selected a communication cell not included in any tracking area in which the immediately previous selected communication cell was included, the speed at which the mobile communication terminal is moving, the direction in which the mobile communication terminal is moving, the frequency of transitions between communication cells, the frequency of transitions between tracking areas, for each tracking area assigned to the mobile terminal, the last time at which the mobile terminal selected a communication cell included in the corresponding assigned tracking area, for each tracking area assigned to the mobile terminal, the last time at which the mobile terminal selected a communication cell not included in the corresponding assigned tracking area, for each tracking area that includes the currently selected communication cell, the last time at which the mobile terminal selected a communication cell not included in the corresponding tracking area that includes the currently selected communication cell and for each communication cell that is a neighbor to the currently selected communication cell, the tracking areas that include the corresponding neighbor communication cell. It is further contemplated that the method further includes transmitting an indication of a type of the information to transmit.

It is contemplated that the indication of the type of the information to transmit is transmitted with the first assignment of at least one tracking area. It is further contemplated that the indication of the type of the information to transmit is transmitted with a second assignment of at least one tracking area.

It is contemplated that the method further includes transmitting the received information to a core network. It is further contemplated that the method further includes determining an amount of the received information to transmit according to the geography of a communication cell currently selected by the mobile communication terminal.

It is contemplated that the received information is received from a network node. It is further contemplated that the method further includes adding additional information to the received information, transmitting the received information and additional information to a core network.

In another aspect of the present invention, a mobile terminal for updating its location is provided. The mobile terminal includes a transmitting/receiving unit transmitting and receiving information, a display unit displaying user interface information, an input unit receiving inputs from a user and a processing unit processing received information including a first assignment of at least one tracking area within which the mobile terminal is allowed to move without performing a tracking area update, the at least one tracking area including a first group of one or more communication cells and performing a tracking area update process upon the occurrence of a trigger condition by controlling the transmitting/receiving unit to transmit information corresponding to at least one of movement of the mobile terminal, one or more communication cells and one or more tracking areas.

It is contemplated that the processing unit further processes received information including a second assignment of at least one tracking area within which the mobile terminal is allowed to move without performing a tracking area update. It is further contemplated that the second assignment of at least one tracking area is based on the transmitted information.

It is contemplated that the transmitted information includes at least one of the identity of each of a specified number of most recent communication cells selected by the mobile terminal, the identity of each tracking area that includes each of a specified number of most recent communication cells selected by the mobile terminal, the identity of each communication cell selected by the mobile terminal during a specified immediately previous time interval, the times at which the mobile terminal selected each communication cell that was selected during a specified immediately previous time interval, the identity of each tracking area that includes a communication cell selected by the mobile terminal during a specified immediately previous time interval, the times during a specified immediately previous time interval at which the mobile terminal selected a communication cell not included in any tracking area in which the immediately previous selected communication cell was included, the speed at which the mobile communication terminal is moving, the direction in which the mobile communication terminal is moving, the frequency of transitions between communication cells, the frequency of transitions between tracking areas, for each tracking area assigned to the mobile terminal, the last time at which the mobile terminal selected a communication cell included in the corresponding assigned tracking area, for each tracking area assigned to the mobile terminal, the last time at which the mobile terminal selected a communication cell not included in the corresponding assigned tracking area, for each tracking area that includes the currently selected communication cell, the last time at which the mobile terminal selected a communication cell not included in the corresponding tracking area that includes the currently selected communication cell and for each communication cell that is a neighbor to the currently selected communication cell, the tracking areas that include the corresponding neighbor communication cell. It is further contemplated that the processing unit further processes received information including an indication of a type of the information to transmit.

It is contemplated that the indication of the type of the information to transmit is received with the first assignment of at least one tracking area. It is further contemplated that the indication of the type of the information to transmit is received with a second assignment of at least one tracking area.

It is contemplated that the trigger condition includes the mobile communication terminal moving to a communication cell not included in the first assigned at least one tracking area. It is further contemplated that the trigger condition is the elapse of a specified time since performing a most recent tracking area update process. Preferably, the trigger condition is the mobile communication terminal remaining within a communication cell for greater than a specific amount of time.

In another aspect of the present invention, a network for updating a location of a mobile terminal is provided. The network includes a transmitter transmitting messages to the mobile terminal, a receiver receiving messages from the mobile terminal and a controller controlling the transmitter to transmit a first assignment of at least one tracking area within which the mobile terminal is allowed to move without performing a tracking area update, the at least one tracking area including a first group of at least one communication cell and processing received information corresponding to at least one of movement of the mobile terminal, one or more communication cells and one or more tracking areas.

It is contemplated that the controller further controls the transmitter to transmit a second assignment of at least one tracking area within which the mobile terminal is allowed to move without performing a tracking area update. It is further contemplated that the second assignment of at least one tracking area is based on the received information.

It is contemplated that the first assignment of at least one tracking area is received from a core network. It is further contemplated that the second assignment of at least one tracking area is received from a core network.

It is contemplated that the received information includes at least one of the identity of each of a specified number of most recent communication cells selected by the mobile terminal, the identity of each tracking area that includes each of a specified number of most recent communication cells selected by the mobile terminal, the identity of each communication cell selected by the mobile terminal during a specified immediately previous time interval, the times at which the mobile terminal selected each communication cell that was selected during a specified immediately previous time interval, the identity of each tracking area that includes a communication cell selected by the mobile terminal during a specified immediately previous time interval, the times during a specified immediately previous time interval at which the mobile terminal selected a communication cell not included in any tracking area in which the immediately previous selected communication cell was included, the speed at which the mobile communication terminal is moving, the direction in which the mobile communication terminal is moving, the frequency of transitions between communication cells, the frequency of transitions between tracking areas, for each tracking area assigned to the mobile terminal, the last time at which the mobile terminal selected a communication cell included in the corresponding assigned tracking area, for each tracking area assigned to the mobile terminal, the last time at which the mobile terminal selected a communication cell not included in the corresponding assigned tracking area, for each tracking area that includes the currently selected communication cell, the last time at which the mobile terminal selected a communication cell not included in the corresponding tracking area that includes the currently selected communication cell and for each communication cell that is a neighbor to the currently selected communication cell, the tracking areas that include the corresponding neighbor communication cell. It is further contemplated that the controller further controls the transmitter to transmit an indication of a type of the information that is to be received.

It is contemplated that the indication of the type of the information that is to be received is transmitted with the first assignment of at least one tracking area. It is further contemplated that the indication of the type of the information that is to be received is transmitted with a second assignment of at least one tracking area.

It is contemplated that the controller further controls the transmitter to transmit the received information to a core network. It is further contemplated that the controller further determines an amount of the received information to transmit according to geography of a communication cell currently selected by the mobile communication terminal.

It is contemplated that the received information is received from a network node. It is further contemplated that the controller further adds additional information to the received information and controls the transmitter to transmit the received information and additional information to a core network.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

The present invention addresses the disadvantages of conventional tracking area management methods by having the UE 1 provide information to the aGW 115 that is related to the cells and/or TAs on which the UE has camped. This facilitates the UE 1 assisting in the selection of the most suitable TAs. The methods of the present invention can be applied either to the UMTS, LTE or any other mobile communication system.

It is important that the aGW 115 provides parameters to the UE 1 that allow for efficient control in order to control the triggering and content of the information sent from the UE 1 to the aGW 115. This can be accomplished via dedicated signaling or via broadcast signaling, such as via system information. The tracking method according to the present invention is illustrated in FIG. 6.

Figure 6:
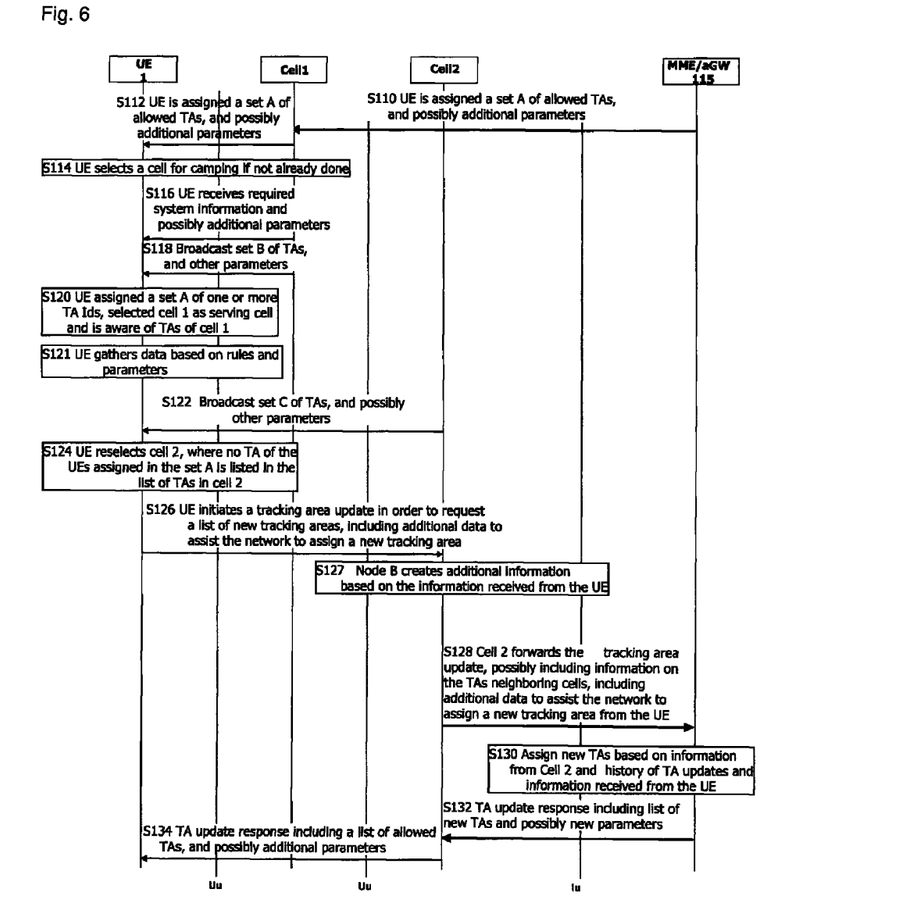
FIG. 6 illustrates a tracking method according to one embodiment of the present invention.

As illustrated in FIG. 6, the UE 1 is assigned a set A of one or more TAs and possibly receives information that allows the UE to collect additional information for subsequent transmission to the aGW 115 in order to assist the assignment of new TA (S110 and S112). The transmission of the additional information may also be done at different occasions, such as when the UE 1 first subscribes to the aGW 115. As illustrated In FIG. 6, this message is sent from the MME 115 via cell 1, but the transmission could be done on any cell.

The UE 1 must make a new TA update once it is under the coverage of a cell that does not broadcast any of the TAs that have been assigned to the UE or for other reasons, such as a periodic TA update. The method of the present invention is applicable whether the TAs are assigned to the UE 1 via the two-step process illustrated in FIG. 6 or the TAs are assigned to the UE from the MME 115 in a manner transparent to the eNB 105 that controls the transmission in cell 1. The eNB 105 also could determine the allowed TAs and indicate the determination to the aGW/MME 115.

The UE 1 then selects a cell for camping (S114). This cell is most likely the cell on which the last TA update was performed and on which the UE 1 has received the information on the TAs to which it is assigned.

The UE 1 then receives relevant system information and possibly information that facilitates the UE collecting additional information for subsequent transmission to the aGW 115 in order to assist the assignment of new TAs (S116). This step may be performed earlier.

The UE 1 receives the set B of TAs of the cell 1 from which the UE must be assigned at least one TA in order to allow camping on the cell without performing a TA update (S118). The UE 1 is now in the stable state where it has selected a tracking cell on which it is allowed to camp without performing a TA update (S120). The UE 1 then gathers information (S121) according to defined rules and parameters received in steps S112 and S116 when it selects other cells that it is allowed to select without triggering a TA update.

Cell 2 broadcasts the set C of TAs and possibly other parameters to the UE 1 (S122). The UE 1 then reselects to the cell 2 where none of the TAs that the UE is allowed to select without performing a tracking area update is broadcast (S124).

Therefore, the UE 1 initiates a TA update in order to update the aGW 115 on the new location of the UE and to request a new set of allowed TAs (S126). Some additional information is included in this request that assists the MME 115, which is the controller of cell 2, to assign a new set of TAs to the UE 1. This message could alternatively be sent directly to the aGW/MME 115 without being processed in the eNB 105.

The eNB 105 then determines some additional information that can assist the MME 115 in selecting the most suitable TAs (S127) based on the information received from the UE 1 and possibly based on other information available in the eNB. Alternatively the eNB 105 may have already determined the TA to be assigned to the UE 1 and may indicate this determination to the aGW/MME 115 and to the UE.

The eNB 105 then sends the request for assignment of new TAs to the MME 115 (S128) and includes any of the additional information from the UE1 or the information determined in the eNB 105. The MME 115 determines the new set of TAs (S130) based on the information received from the eNB 105, which includes any of the information from the UE 1 or the eNB. The MME 115/eNB 105 then assigns a new set of TAs and possibly parameters related to determining the additional information (S132 and S134).

Figure 7:
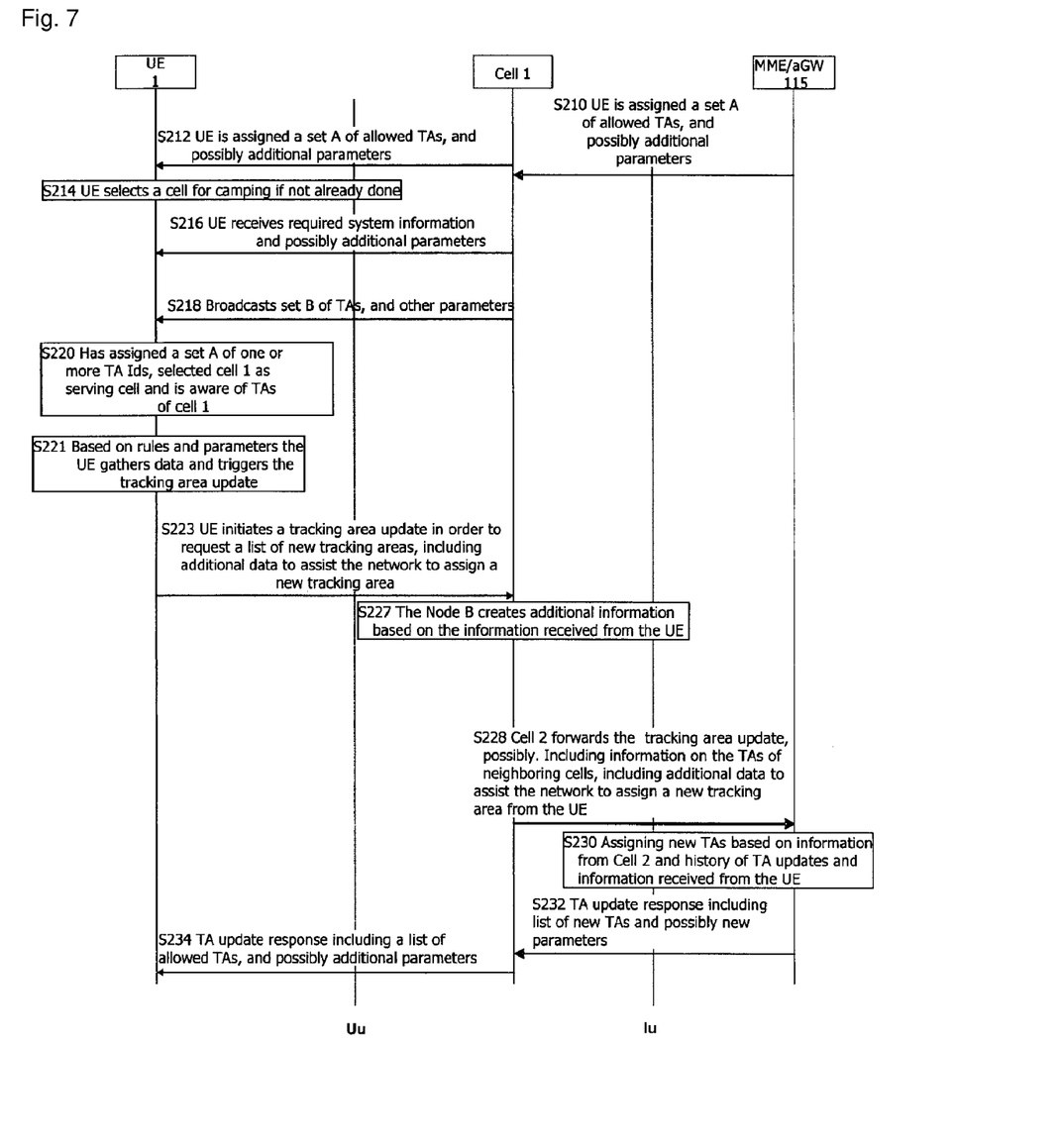
FIG. 7 illustrates a tracking method according to another embodiment of the present invention.

Alternatively, the UE 1 may also send additional information that allows the eNB 105/MME115 to assign more suitable TAs to the UE based on a trigger that is independent of the cell reselection or periodic timer. For example, if the UE 1 is assigned several TAs, or a large TA, but the UE has not moved from a current cell for a long time, the UE may indicate this information to the aGW 115 in order to allow the aGW to assign different TAs to the UE, such as a more restrictive list of TAs, in order to reduce the paging load. FIG. 7 illustrates this method.

Steps S210 to S220 are identical to steps S110 to S120 in FIG. 6. Therefore, these steps will not be addressed.

The UE 1 still gathers additional information in order to assist the aGW 115 in selecting the most suitable TAs (S221). Additionally, the UE 1 is still camping on a cell on which it is allowed to camp and will initiate a TA update based on a UE internal trigger (S221). This internal trigger may be due, for example, to the fact that during a given time period all the cells that the UE 1 has reselected broadcast at least one TA, thereby making it advantageous that the UE should be assigned only this TA.

In a manner similar to the method illustrated in FIG. 6, the UE 1 performs the TA update procedure including some more specific information to allow the aGW 115 to assign the most suitable TA information (S223). The UE 1 initiates a TA update in order to request a new set of allowed TAs (S223). Some additional information is included in this request to assist the MME 115, which is the controller of cell 2, to assign a new set of TAs to the UE 1.

The eNB 105 then determines some additional information that can assist the MME 115 in selecting the most suitable TAs (S227). The eNB 105 determines this additional information based on the information received from the UE 1 and possibly based on other information, such as the list of TAs of the neighboring cells available in the eNB. The eNB 105 sends a request for assignment of new TAs to the MME 115 and includes any of the additional information from the UE 1 or the information determined in the eNB (S228).

The MME 115 determines the new set of TAs based on the information received from the eNB 105 and any of the information from the UE 1 or the eNB. The MME 115/eNB 105 assigns a new set of TAs and possibly parameters related to determining the additional information (S232 and S234).

The description of the methods in FIGS. 6 and 7 assume that the MME 115 assigns the TAs to the UE 1. It is also be possible that the eNB 105, which is the controller of one or more cells, assigns the TAs and only indicates the assigned TA to the MME 115.

The additional information transmitted from the UE 1 to the aGW 115 in steps S126 and S128 of FIG. 6 and steps 223 and S228 of FIG. 7 in order to facilitate selection of the most suitable TAs would ideally be the list of cells that the UE visited with the timestamps for the change of cells and, additionally, the related TAs. This information is used by the aGW 115 to determine the most suitable TAs for assignment to the UE 1 as illustrated in steps S127 and S130 in FIG. 6 and steps S227 and S230 of FIG. 7.

However, the UE 1 must filter the information because this information would require too many resources for transmission. This filtering could, for example, imply that the UE 1 only reports the x latest cell IDs and/or associated TAs before the TA update has started or the cells or TAs on which the UE has camped during the previous y seconds before initiating the TA update, possibly including timestamps.

The number of cells or TAs, the time period y or whether the UE 1 should also report timestamps must either be fixed as a rule or previously indicated to the UE in order to facilitate this filtering. The information may be previously indicated to the UE 1 either by transmission of system information, as illustrated in step S116 of FIG. 6 and S216 of FIG. 7, or in a dedicated message, as illustrated in steps S110 and S112 of FIG. 6 and steps 210 and S212 of FIG. 7.

Other parameters reported to the aGW 115 may include the UE 1 speed, direction, or average number of cell or TA changes per second. Whether the UE 1 should transmit this information depends on whether the UE is allowed or ordered to transmit the information either by fixed rules or by information received from the aGW 115. The information may be received from the aGW 115 either via transmission of system information, as illustrated in step S116 of FIG. 6 and S216 of FIG. 7, or via a dedicated message, as illustrated in steps S110 and S112 of FIG. 6 and steps 210 and S212 of FIG. 7.

Other information reported to the aGW 115 may include a list of TAs that were available on all cells on which the UE 1 was camping during the latest z seconds before the TA update.

The value of z would be fixed in a rule or configured by the aGW 115, such as via system information or via dedicated signaling.

Alternatively the UE 1 could report the last time at which the UE camped on a cell on which that TA was indicated or not indicated for each TA present in the current cell or for each TA that is assigned to the UE. This information would facilitate determining the most suitable TAs for the UE 1.

The UE 1 could also include information on the TAs that are broadcast on neighboring cells in order to prevent the need for further TA updates, possibly only if on a given neighboring cell there is no TA broadcast to which the UE has not yet been assigned. The UE 1 can either receive the TAs of the neighboring cell from the cell on which it is currently camping or receive the system information from the neighboring cell in order to determine the TA of the neighboring cell. Therefore, the aGW 115 can assign these TAs to the UE 1 and thereby prevent the UE from camping on a cell on which the UE would possibly receive the paging beforehand.

Additionally the speed or average number of cell or TA changes or the direction of the UE 1 could be reported to the eNB 105. This would allow the eNB 105 to calculate the TAs that are most suitable for the UE 1.

The aGW 115 could determine the direction and speed of the UE 1 based on the list of cells or TAs and timestamps and thereby determine the TAs of the cells on which the UE most likely will camp in the future in order to select from amongst them a suitable set for assignment to the UE. Of course, if the UE 1 speed, direction or average number of cell or TA changes per second is known, the aGW 115 can also use this information to determine the TAs of the cells on which the UE most likely will camp in the future in order to select from amongst them a suitable set for assignment to the UE based on knowledge of the topology of the cells and TAs.

The aGW 115 knows, for each TA present in the current cell or for each TA that is assigned to the UE 1, the last time instant at which the UE camped on a cell on which that TA was indicated or not indicated if the aGW knows a list of TAs that was available on all cells on which the UE was camping during the latest z seconds before the TA update. Therefore, the aGW 115 can select the TAs most suitable for the UE from amongst those TAs and the neighboring TAs that the aGW can determine based on knowledge of the topology of cells and TAs.

This kind of information could also be included in periodic TA updates that are transmitted under normal circumstances in order to reduce the unnecessary overhead. Furthermore, there are several possible triggers for performing a TA update, as illustrated in step S221 of FIG. 7.

One possible trigger for the UE 1 to initiate a TA update is when the speed or average number of cell or TA changes of the UE 1 is above or below a specified threshold or when the speed, average number of cell or TA changes or direction of the UE has changed. The threshold could be configured in the UE 1 either based on rules or according to information received via broadcast or dedicated signaling from the aGW 115.

Another possible trigger for the UE 1 to initiate a TA update is if a TA broadcast exists on all cells that the UE has selected during the last x seconds and the UE does not have this TA assigned, or the UE has other TAs other than that assigned TA. This allows, for example, a UE 1 that is assigned an overlapping TA, such as TAE in FIG. 5, to trigger a TA update procedure when it is camping for the time x seconds in cell 10. This is because the UE 1 has not been assigned TAC in FIG. 5, which would allow a more efficient handling since $TA_C$ spans a smaller area and, therefore, would reduce the paging load. The aGW 115 can thereby reduce the unnecessary paging in cells 9 and 13 illustrated in FIG. 5.

Another possible trigger for the UE 1 to initiate a TA update is when the UE 1 receives information on TAs from neighboring cells where, for a given neighboring cell, none of the TAs related to the neighboring cell is assigned to the UE. Similarly, the information on the TAs could either be broadcast in system information on the cell on which the UE 1 is currently camping or received via the system information of the neighboring cell. Therefore, the UE 1 may need to read additional system information from neighboring cells.

Figure 8:
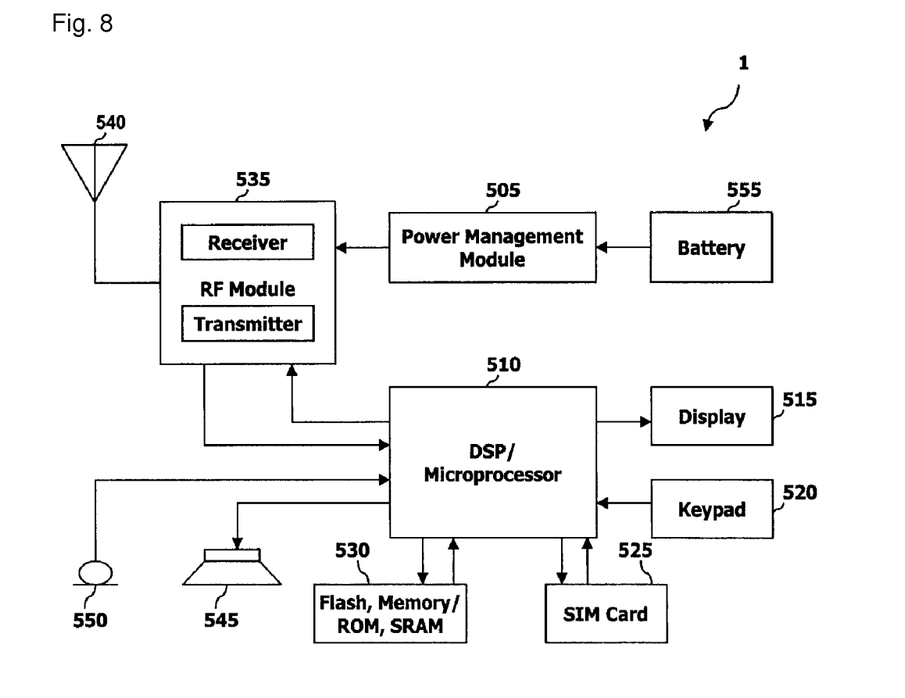
FIG. 8 illustrates a block diagram of a mobile station (MS) or user equipment (UE) according to the present invention.

FIG. 8 illustrates a block diagram of a mobile station (MS) or UE 1. The UE 1 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method of updating a location of a mobile terminal, the method comprising:

receiving, by the mobile terminal, a first assignment of at least one first tracking area within which the mobile terminal is allowed to move without performing a tracking area update, the at least one first tracking area comprising a first group of one or more communication cells;

receiving, by the mobile terminal, broadcast information indicating at least one second tracking area within which the mobile terminal is allowed to move without performing a tracking area update, the at least one second tracking area comprising a second group of one or more communication cells;

determining, by the mobile terminal, that a new tracking area update is required if any of the at least one first tracking area is not indicated by the broadcast information; and when it is determined that the new tracking area update is required, performing, by the mobile terminal, a tracking area update process from within the assigned at least one first tracking area and outside of other tracking areas and transmitting reporting information to a core network, the reporting information indicating an identity of each of a predefined number of most recent communication cells on which the mobile terminal has camped before performing the tracking area update process.

2. The method of claim 1, further comprising receiving a second assignment of at least one third tracking area within which the mobile terminal is allowed to move without performing a tracking area update.

3. The method of claim 2, wherein the second assignment of the at least one third tracking area is based on the reporting information.

4. The method of claim 1, wherein the reporting information comprises at least:
   an identity of each of a specified number of most recent communication cells selected by the mobile terminal;
   an identity of each tracking area that includes each of a specified number of most recent communication cells selected by the mobile terminal;
   an identity of each communication cell selected by the mobile terminal during a specified immediately previous time interval;
   a plurality of times at which the mobile terminal selected each communication cell that was selected during the specified immediately previous time interval;
   an identity of each tracking area that includes a communication cell selected by the mobile terminal during the specified immediately previous time interval;
   a plurality of times during the specified immediately previous time interval at which the mobile terminal selected a communication cell not included in any tracking area in which the immediately previous selected communication cell was included;
   a speed at which the mobile terminal is moving;
   a direction in which the mobile terminal is moving;
   a frequency of transitions between communication cells;
   a frequency of transitions between tracking areas;
   for each of the at least one first tracking area assigned to the mobile terminal, a last time at which the mobile terminal selected a communication cell included in the corresponding assigned tracking area;
   for each of the at least one first tracking area assigned to the mobile terminal, a last time at which the mobile terminal selected a communication cell not included in the corresponding assigned tracking area;
   for each of the at least one first tracking area that includes a currently selected communication cell, a last time at which the mobile terminal selected a communication cell not included in the corresponding tracking area that includes the currently selected communication cell; or
   for each communication cell that is a neighbor to the currently selected communication cell, one or more tracking areas that include the corresponding neighbor communication cell.

5. The method of claim 1, further comprising receiving an indication of a type of the reporting information to transmit.

6. The method of claim 5, wherein the indication of the type of the reporting information to transmit is received with the first assignment of at the least one first tracking area.

7. The method of claim 5, wherein the indication of the type of the reporting information to transmit is received with a second assignment of at least one third tracking area.

8. A mobile terminal for updating its location, the mobile terminal comprising:
   a transceiver for transmitting and receiving information; and
   a processor coupled to the transceiver and configured to:
      receive a first assignment of at least one first tracking area within which the mobile terminal is allowed to move without performing a tracking area update, the at least one first tracking area comprising a first group of one or more communication cells;
      receive broadcast information indicating at least one second tracking area within which the mobile terminal is allowed to move without performing a tracking area update, the at least one second tracking area comprising a second group of one or more communication cells;
      determine that a new tracking area update is required if any of the at least one first tracking area is not indicated by the broadcast information; and
      when it is determined that the new tracking area update is required, perform a tracking area update process from within the assigned at least one first tracking area and outside of other tracking areas and transmit reporting information to a core network, the reporting information indicating an identity of each of a predefined number of most recent communication cells on which the mobile terminal has camped before performing the tracking area update process.

9. The mobile terminal of claim 8, wherein the processor is further configured to receive a second assignment of at least one third tracking area within which the mobile terminal is allowed to move without performing a tracking area update.

10. The mobile terminal of claim 9, wherein the second assignment of the at least one third tracking area is based on the reporting information.

11. The mobile terminal of claim 8, wherein the reporting information comprises at least:
   an identity of each of a specified number of most recent communication cells selected by the mobile terminal;
   an identity of each tracking area that includes each of a specified number of most recent communication cells selected by the mobile terminal;
   an identity of each communication cell selected by the mobile terminal during a specified immediately previous time interval;
   a plurality of times at which the mobile terminal selected each communication cell that was selected during the specified immediately previous time interval;
   an identity of each tracking area that includes a communication cell selected by the mobile terminal during the specified immediately previous time interval;
   a plurality of times during the specified immediately previous time interval at which the mobile terminal selected a communication cell not included in any tracking area in which the immediately previous selected communication cell was included;

a speed at which the mobile terminal is moving;

a direction in which the mobile terminal is moving;

a frequency of transitions between communication cells;

a frequency of transitions between tracking areas;

for each of the at least one first tracking area assigned to the mobile terminal, a last time at which the mobile terminal selected a communication cell included in the corresponding assigned tracking area;

for each of the at least one first tracking area assigned to the mobile terminal, a last time at which the mobile terminal selected a communication cell not included in the corresponding assigned tracking area;

for each of the at least one first tracking area that includes a currently selected communication cell, a last time at which the mobile terminal selected a communication cell not included in the corresponding tracking area that includes the currently selected communication cell; or for each communication cell that is a neighbor to the currently selected communication cell, one or more tracking areas that include the corresponding neighbor communication cell.

12. The mobile terminal of claim 8, wherein the processor is further configured to receive information comprising an indication of a type of the reporting information to transmit.

13. The mobile terminal of claim 12, wherein the indication of the type of the reporting information to transmit is received with the first assignment of the at least one first tracking area.

14. The mobile terminal of claim 12, wherein the indication of the type of the reporting information to transmit is received with a second assignment of at least one third tracking area.

* * * * *